Nov. 14, 1961
H. W. SINNETT
3,008,757
EXTENSIBLE VISOR ARRANGEMENT FOR VEHICLES
Filed Feb. 17, 1958
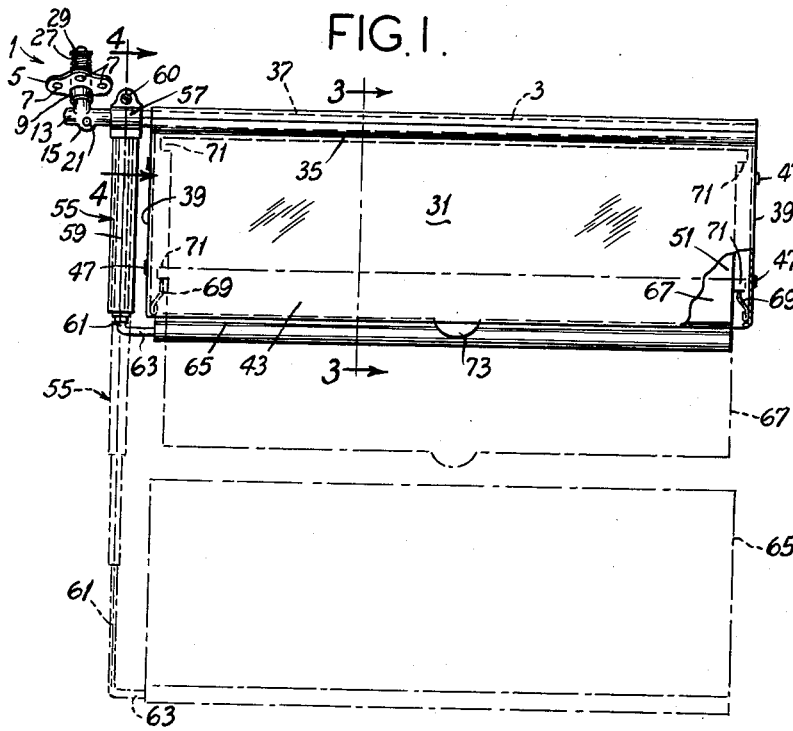
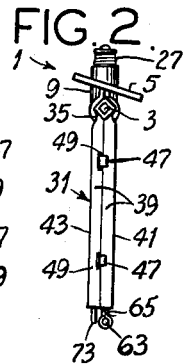
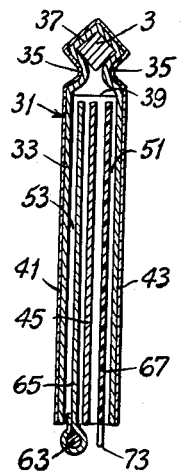
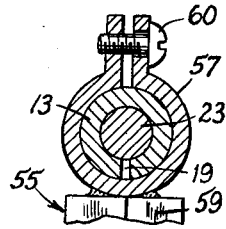
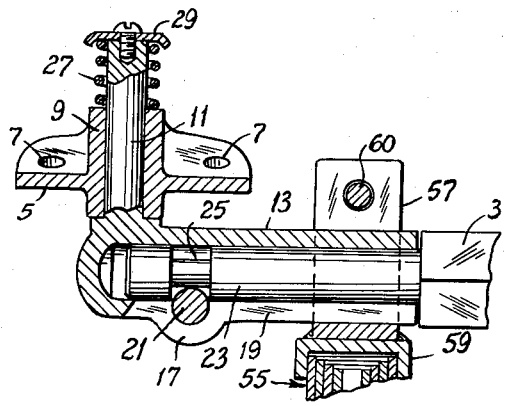
Herschel W. Sinnett,
Inventor.
Koenig and Pope,
Attorneys.

United States Patent Office 3,008,757
Patented Nov. 14, 1961

3,008,757
EXTENSIBLE VISOR ARRANGEMENT FOR VEHICLES
Hershel W. Sinnett, 649 Collinsville Ave., East St. Louis, Ill.
Filed Feb. 17, 1958, Ser. No. 715,553
14 Claims. (Cl. 296—97)

This invention relates to sun visors, and more particularly to a sun visor for interior use in automobiles and trucks.

Among the several objects of the invention may be noted the provision of an improved sun visor, particularly for use in automobiles and trucks, by means of which the driver or a passenger of the vehicle may be shielded from glare off the hood of the vehicle as well as shielded from glare coming through the upper part of the windshield of the vehicle; the provision of a sun visor such as described having a main shield for shielding against glare through the upper part of the windshield and an auxiliary shield adapted to occupy a position on the dash of the vehicle for shielding against glare off the hood, the auxiliary shield being carried together with the main shield and being mounted so that it can be retracted upwardly from its operative position on the dash to a retracted position in respect to the main shield, and then being movable with the main shield to an out-of-the-way position against the ceiling of the vehicle; the provision of a sun visor such as described in which the auxiliary shield, when in operative position on the dash, may be tilted to various angular positions so as to best shield against glare off the hood without unduly impeding visibility; and the provision of a sun visor having the stated features which is economical to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

FIG. 1 is a view in elevation of a sun visor of this invention, with parts broken away and shown in section, and illustrating in dotted lines a lowered position of the auxiliary shield, and a lowered position of a main shield extension;

FIG. 2 is an end view of FIG. 1 as viewed from the right, a covering being broken away;

FIG. 3 is an enlarged vertical section taken on line 3—3 of FIG. 1;

FIG. 4 is an enlarged vertical section taken on line 4—4 of FIG. 1; and

FIG. 5 is an enlarged section of the supporting means at the upper left corner of FIG. 1.

Corresponding reference characters indicate corresponding parts throughout the several views of the drawings.

Referring to the drawings, a sun visor of this invention is shown to comprise supporting means designated in its entirety by the reference character 1 including a main rod 3 adapted to be mounted in a vehicle with the rod 3 extending generally horizontally adjacent the top of the windshield of the vehicle. As shown, the supporting means 1 includes a plate 5 having screw holes 7 for receiving screws for attaching it to the ceiling of the vehicle, the plate being formed with a generally vertical tubular bearing 9. Journalled in this bearing is a short vertical shaft 11. Extending horizontally from the lower end of the shaft 11 is a longitudinally split tubular arm 13 which receives one end of the rod 3. The tubular arm 13 has ears 15 and 17 on opposite sides of the split 19 of the arm which receive a screw 21 for squeezing the arm on the portion 23 of the rod 3 received in the arm for a friction fit of portion 23 in the arm. The latter has an annular groove 25 receiving the screw to hold the rod in the arm. A coil compression spring 27 reacts from the upper end of bearing 9 against a collar 29 on the upper end of the shaft 11 to provide friction for resisting turning of shaft 11 and arm 13.

A main shield 31 is pivotally carried by the main rod and adapted to be swung from the downwardly extending shielding position in which it is illustrated in FIGS. 1–3 to a generally horizontal raised position against the ceiling of the vehicle, as is conventionally desired. This main shield is of special construction, being shown as comprising a sheet metal plate 33 bent to narrow U-shape, and having constrictions indicated at 35 adjacent the bend of the U-shape defining a passage 37 extending lengthwise of the shield which receives the rod 3. As illustrated, the portion of the rod 3 received in the passage is of square cross section, and the passage is of corresponding cross section so that the rod rotates with the shield. The sheet metal plate 33 also has portions 39 bent over at the ends of the U-shape to provide end walls. The front and back walls of the U-shape are designated 41 and 43. These are spaced from one another. Extending from end-to-end of the U-shaped plate member 33 intermediate the walls 41 and 43 is a partition plate 45. This is secured in assembly with plate 33 as by having tangs 47 at its ends passing through holes 49 in end walls 39 and bent over on the outside of the end walls. The partition plate 45 divides the space within the U-shaped member 33 into two compartments, the front one of which is designated 53 and the rear one of which is designated 51. These compartments are open at the bottom.

An extensible rod 55, in particular a telescoping rod, has one end pivoted on the arm 13 for swinging movement in a plane generally at right angles to arm 13 and rod 3 and located at the left end of the main shield 31 as illustrated in FIG. 1. As shown, the pivoting of the telescoping rod on arm 13 is effected by providing clamping means 57 on the end of the external or outermost sleeve section 59 of the telescoping rod. This clamping means straddles the arm and has a clamping bolt 60 for tightening it on the arm to provide a friction fit. The sections of the telescoping rod are preferably out-of-round cross section so that they do not rotate relative to one another on the axis of the telescoping rod. When fully retracted, the length of the telescoping rod generally corresponds to the height of the main shield 31.

Extending laterally outward from the end of the internal or innermost section 61 of the telescoping rod 55 is an auxiliary rod 63. This extends generally parallel to the main rod 3 below the latter and is movable between a raised retracted position adjacent the open bottom of the front compartment 53 and an extended lowered position spaced from the main shield 31 by retracting and extending the telescoping rod 55. Pivotally carried by the auxiliary rod 63 is an auxiliary shield 65, which may consist of a fabric covered sheet metal plate. When the auxiliary rod 63 is raised (and the telescoping rod 55 retracted) this auxiliary shield is received in the front compartment. The auxiliary shield is adapted to be pulled down out of the front compartment (the telescoping rod 55 being extended) and then it may be tilted to various angular positions.

A main shield extension 67 is slidable into and out of the rear compartment for increasing the main shield area if so desired. This extension may consist of a sheet of rigid colored translucent plastic. Leaf springs 69 are mounted at the ends of the front compartment at the bottom for guiding the extension 67, and the latter has lateral projections 71 at its upper corners engageable with the leaf springs for keeping it from coming completely out of the rear compartment. Extension 67 is shown as provided with a tab 73 at the bottom for grasping it to pull it out.

Ordinarily, the auxiliary shield 65 is located in the compartment 53, and then swings with the main shield 31 whenever the latter is swung up or down. To use the auxiliary shield for protection from glare off the hood of the vehicle, the auxiliary shield is pulled out of the main shield, the telescoping rod 55 is extended, and is brought down to a position wherein its lower edge engages or is located close to the dash of the vehicle. This positioning of the auxiliary shield is independent of the main shield because the telescoping rod 55 may swing independently of the main shield on the arm 13. Once the auxiliary shield has been lowered to the dash, it may be tilted to the most effective position for shielding against glare off the hood without unduly impeding visibility.

It will be understood that the pivotal mounting and shape of the auxiliary shield 65 may be made to conform to the shape of the dash of the vehicle, noting that in some vehicles the dash has a curved portion in front of the steering wheel. It will be also understood that, if desired, the telescoping rod 55 may be power-operated.

In view of the above, it will be seen that the several objects of the invention are achieved and other advantages results attained.

As various changes could be made in the above constructions without departing from the scope of the invention, it is intended that all matter contained in the above description or shown in the accompanying drawings shall be interpreted as illustrative and not in a limiting sense.

I claim:

1. A sun visor comprising supporting means including a main rod, said supporting means being adapted to be mounted in a vehicle with said main rod extending generally horizontally adjacent the top of the windshield of the vehicle, a main shield carried by said rod and adapted to be swung on the axis of said main rod from a downwardly extending shielding position to a generally horizontal raised position, an extensible rod having one end pivotally supported by said supporting means for swinging movement on the axis of said main rod in a plane generally at right angles to said main rod, said extensible rod being located at one end of said main shield, and an auxiliary shield mounted to extend laterally from the other end of said extensible rod and being movable between a retracted position adjacent said main shield and an extended position away from said main shield by retracting and extending said extensible rod, said main shield being formed with a compartment for receiving said auxiliary shield when the latter is in retracted position.

2. A sun visor comprising supporting means including a main rod, said supporting means being adapted to be mounted in a vehicle with said main rod extending generally horizontally adjacent the top of the windshield of the vehicle, a main shield carried by said main rod and adapted to be swung on the axis of said main rod from a downwardly extending shielding position to a generally horizontal raised position, an extensible rod having one end pivotally supported by said supporting means for swinging movement on the axis of said main rod in a plane generally at right angles to said main rod, said extensible rod being located at one end of said main shield, an auxiliary rod extending laterally from the other end of said extensible rod generally parallel to said main rod and being movable between a retracted position adjacent said main shield and an extended position away from said main shield by retracting and extending said extensible rod, and an auxiliary shield carried by said auxiliary rod, said extensible rod being swingable independently of said main shield and said auxiliary shield being pivotally carried by said auxiliary rod for being tilted to various angular positions, said main shield being of hollow form and open along its edge spaced from the main rod to provide a compartment for receiving the auxiliary shield when the latter is in retracted position.

3. A sun visor comprising supporting means including a bracket, an arm rotatably carried by the bracket, and a main rod extending from the arm and mounted in the arm for rotation on an axis generally at right angles to the axis of rotation of the arm, said bracket being adapted to be mounted in a vehicle with said main rod extending generally horizontally adjacent the top of the windshield of the vehicle, a main shield mounted at its upper edge on said main rod and adapted to be swung from a downwardly extending shielding position to a generally horizontal raised position, said main shield having front and back walls defining a compartment extending from end to end of the main shield and being open along the edge of the shield spaced from the main rod, an extensible rod having one end pivotally mounted on said arm for swinging movement in a plane generally at right angles to said main rod, and an auxiliary shield mounted to extend laterally from the other end of said extensible rod and being movable between a retracted position within said compartment and an extended position away from said main shield by retracting and extending said extensible rod.

4. A sun visor as set forth in claim 3 wherein said extensible rod is swingable independently of said main shield and said auxiliary shield is mounted for swinging movement on an axis generally at right angles to the extensible rod for being tilted to various angular positions.

5. A sun visor comprising supporting means including a bracket, an arm rotatably carried by the bracket, and a main rod extending from the arm and mounted in the arm for rotation on an axis generally at right angles to the axis of rotation of the arm, said bracket being adapted to be mounted in a vehicle with said main rod extending generally horizontally adjacent the top of the windshield of the vehicle, a main shield mounted at its upper edge on said main rod and adapted to be swung from a downwardly extending shielding position to a generally horizontal raised position, said main shield having front and back walls defining a compartment extending from end to end of the main shield and being open along the edge of the shield spaced from the main rod, a telescoping rod having one end pivotally mounted on said arm for swinging movement in a plane generally at right angles to said main rod, an auxiliary rod extending laterally from the other end of said telescoping rod generally parallel to said main rod, and an auxiliary shield carried by said auxiliary rod and being movable between a retracted position within said compartment and an extended position away from said main shield by retracting and extending said telescoping rod.

6. A sun visor as set forth in claim 5 wherein said auxiliary shield is pivotally carried by said auxiliary rod for being tilted to various angular positions.

7. A sun visor comprising supporting means including a main rod, said supporting means being adapted to be mounted in a vehicle with said rod extending generally horizontally adjacent the top of the windshield of the vehicle, a main shield carried at its upper edge by said rod and adapted to be swung on the axis of said main rod from a downwardly extending shielding position to a generally horizontal raised position, said main shield having front and back walls and a partition extending endwise defining front and back compartments open along the edge of the shield spaced from the main rod, a main shield extension slidable into and out of one of said compartments, an extensible rod having one end pivotally supported by said supporting means for swinging movement on the axis of said main rod in a plane generally at right angles to said main rod, said extensible rod being located at one end of said main shield, and an auxiliary shield mounted to extend laterally from the other end of said extensible rod and being movable between a retracted position within the other of said compartments and an extended position away from said main shield by retracting and extending said extensible rod.

8. A sun visor comprising supporting means including a bracket, an arm rotatably carried by the bracket, and a main rod extending from the arm and mounted in the arm for rotation on an axis generally at right angles to the axis of rotation of the arm, said bracket being adapted to be mounted in a vehicle with said main rod extending generally horizontally adjacent the top of the windshield of the vehicle, a main shield mounted at its upper edge on said main rod and adapted to be swung from a downwardly extending shielding position to a generally horizontal raised position, an extensible rod having one end pivotally mounted on said arm for swinging movement in a plane generally at right angles to said main rod, and an auxiliary shield mounted to extend laterally from the other end of said extensible rod and being movable between a retracted position adjacent said main shield and an extended position away from said main shield by retracting and extending said extensible rod.

9. A sun visor as set forth in claim 8 wherein said extensible rod is swingable independently of said main shield and said auxiliary shield is mounted for swinging movement on an axis generally at right angles to the extensible rod for being tilted to various angular positions.

10. A sun visor comprising supporting means including a bracket, an arm rotatably carried by the bracket, and a main rod extending from the arm and mounted in the arm for rotation on an axis generally at right angles to the axis of rotation of the arm, said bracket being adapted to be mounted in a vehicle with said main rod extending generally horizontally adjacent the top of the windshield of the vehicle, a main shield mounted at its upper edge on said main rod and adapted to be swung from a downwardly extending shielding position to a generally horizontal raised position, a telescoping rod having one end pivotally mounted on said arm for swinging movement in a plane generally at right angles to said main rod, an auxiliary rod extending laterally from the other end of said telescoping rod generally parallel to said main rod, and an auxiliary shield carried by said auxiliary rod and being movable between a retracted position adjacent said main shield and an extended position away from said main shield by retracting and extending said telescoping rod.

11. A sun visor as set forth in claim 10 wherein said auxiliary shield is pivotally carried by said auxiliary rod for being tilted to various angular positions.

12. A sun visor comprising supporting means including a bracket, an arm rotatably carried by the bracket, and a main rod extending from the arm and mounted in the arm for rotation on an axis generally at right angles to the axis of rotation of the arm, said bracket being adapted to be mounted in a vehicle with said main rod extending generally horizontally adjacent the top of the windshield of the vehicle, a main shield mounted at its upper edge on said main rod and adapted to be swung from a downwardly extending shielding position to a generally horizontal raised position, a telescoping rod comprising a plurality of tubular sections and including an outermost section, intermediate sections and an innermost section slidable one within another, said intermediate and innermost sections being slidable into and out of one end of the outermost section, said outermost section having pivot means thereon at its other end whereby it is carried by said arm along with the main rod for swinging movement relative to said arm and main rod in a plane generally at right angles to said main rod at the end of said main rod toward said arm, an auxiliary rod extending laterally from the outer end of said innermost section of the telescoping rod generally parallel to said main rod, and an auxiliary shield pivotally carried by said auxiliary rod, said auxiliary shield being adapted, when said intermediate and innermost sections of said telescoping rod are retracted, to occupy a retracted position adjacent said main shield wherein said auxiliary shield is generally flatwise in relation to said main shield, and adapted to occupy a generally horizontal raised position along with said main shield when said main shield is in its generally horizontal raised position, said auxiliary sheild being adapted to be moved down to an extended position adjacent the dash of the vehicle for glare-shielding purposes by extension of said intermediate and innermost sections of said telescoping rod, and being adapted to be tilted to various angular positions on said auxiliary rod.

13. A sun visor construction comprising a telescoping rod comprising a plurality of tubular sections and including an outermost section, intermediate sections and an innermost section slidable one within another between an extended position and a retracted position, said intermediate and innermost sections being slidable into and out of one end of the outermost section, pivot means at the other end of the outermost section for mounting the outermost section and the other sections for swinging movement on a first axis extending transversely to the length of said sections, a rod extending laterally from the outer end of said innermost section of the telescoping rod generally parallel to said first axis, and a generally rectangular shield having one of its long edges extending lengthwise of and mounted on said laterally extending rod, said shield being pivotable about the axis of said laterally extending rod so that it may be tilted to various angular positons about the axis of said laterally extending rod, the length of the short edges of the rectangular shield corresponding substantially to the length of the telescoping rod when the intermediate and innermost sections are completely retracted into the outermost section thereof, said shield serving as a glare shield in one of said positions of said rod and as a sun visor in the other of said positions of said rod.

14. A sun visor construction as set forth in claim 13 wherein said pivot means at the other end of said outermost section is mounted on a member which is pivotable on an axis substantially at right angles to said first axis.

References Cited in the file of this patent

UNITED STATES PATENTS

| | | |
|---|---|---|
| 1,941,032 | Knowles | Dec. 26, 1933 |
| 2,101,901 | Fletcher | Dec. 14, 1937 |
| 2,207,668 | Hudgings | July 9, 1940 |
| 2,385,557 | Ward | Sept. 25, 1945 |
| 2,695,193 | Hamel | Nov. 23, 1954 |
| 2,733,763 | Nygaard | Feb. 7, 1956 |
| 2,740,659 | Scholz | Apr. 3, 1956 |
| 2,878,714 | VanDenburg | Mar. 24, 1959 |

FOREIGN PATENTS

| | | |
|---|---|---|
| 527,139 | Belgium | Mar. 31, 1959 |
| 1,053,397 | France | Sept. 30, 1953 |